(12) United States Patent
Whitney, Jr. et al.

(10) Patent No.: US 10,865,923 B2
(45) Date of Patent: Dec. 15, 2020

(54) PUSH-FIT FITTING AND END BUSHING FOR USE THEREWITH

(71) Applicant: Accor Technology, Inc., Kirkland, WA (US)

(72) Inventors: Charlie E. Whitney, Jr., East Wenatchee, WA (US); Jerry Edward O'Neill, Kirkland, WA (US)

(73) Assignee: Accor Technology, Inc., Kirkland, WA (US)

( * ) Notice: Subject to any disclaimer, the term of this patent is extended or adjusted under 35 U.S.C. 154(b) by 0 days.

(21) Appl. No.: 16/195,387

(22) Filed: Nov. 19, 2018

(65) Prior Publication Data

US 2020/0158275 A1 May 21, 2020

(51) Int. Cl.
*F16L 37/092* (2006.01)

(52) U.S. Cl.
CPC ..... *F16L 37/0925* (2013.01); *Y10T 137/6065* (2015.04)

(58) Field of Classification Search
CPC ........ F16K 137/091; F16K 1/12; F16K 1/123; Y01T 137/6065; F16L 37/088; F16L 37/091; B29C 66/05; B29C 66/1248
See application file for complete search history.

(56) References Cited

U.S. PATENT DOCUMENTS

| 1,440,207 | A | 12/1922 | Burns |
|---|---|---|---|
| 2,158,757 | A | 5/1939 | Kuestermeier |
| 2,484,192 | A | 10/1949 | Squiller |
| 2,840,395 | A | 6/1958 | Tarnow |
| 3,135,033 | A | 6/1964 | Jackson |
| 3,204,988 | A | 9/1965 | Ouderkirk et al. |
| 3,312,484 | A | 4/1967 | Davenport |
| 3,429,596 | A | 2/1969 | Marshall |
| 3,429,598 | A | 2/1969 | Marshall |
| 3,837,687 | A | 9/1974 | Leonard |
| 3,874,709 | A | 4/1975 | MacDonald |
| 3,995,897 | A | 12/1976 | Paskert |
| 4,059,297 | A | 11/1977 | Grahl et al. |
| 4,062,574 | A | 12/1977 | Scholin |

(Continued)

FOREIGN PATENT DOCUMENTS

| DE | 9415532 U1 | 2/1995 |
|---|---|---|
| EP | 602498 A1 | 6/1994 |

(Continued)

*Primary Examiner* — Kevin R Barss
(74) *Attorney, Agent, or Firm* — Davis Wright Tremaine LLP; George C. Rondeau, Jr.

(57) ABSTRACT

A plumbing fitting couplable with a free-end portion of a pipe. The fitting has a chamber with an opening and an interior chamber wall with a circumferentially extending chamber groove, and an end bushing with an interior opening sized to receive the pipe free-end portion and an exterior wall portion having an outwardly projecting, circumferentially extending locking member within the chamber groove to resist movement of the end bushing out of the first chamber opening. A seal and gripper ring within the chamber seal with and releasably grip the pipe free-end portion. The end bushing interior opening has an end bushing interior wall portion sized to be engaged by the free-end portion of the pipe when within the end bushing interior opening to resist disengagement of the locking member from the chamber groove while the free-end portion of the pipe is within the end bushing interior opening.

29 Claims, 11 Drawing Sheets

(56) References Cited

U.S. PATENT DOCUMENTS

| | | |
|---|---|---|
| 4,073,514 A | 2/1978 | Pate |
| 4,084,843 A | 4/1978 | Gassert |
| 4,099,749 A | 7/1978 | van Vliet |
| 4,124,235 A | 11/1978 | Grahl et al. |
| 4,146,254 A | 3/1979 | Turner et al. |
| 4,181,329 A | 1/1980 | Helm |
| 4,288,113 A | 9/1981 | Saulnier |
| 4,324,407 A | 4/1982 | Upham et al. |
| 4,390,159 A | 6/1983 | Duncan |
| 4,490,576 A | 12/1984 | Bolante et al. |
| 4,508,369 A | 4/1985 | Mode |
| 4,586,734 A | 5/1986 | Grenier |
| 4,593,943 A | 6/1986 | Hama et al. |
| 4,613,172 A | 9/1986 | Schattmaier |
| 4,632,437 A | 12/1986 | Robson et al. |
| 4,635,975 A | 1/1987 | Campbell |
| 4,645,245 A | 2/1987 | Cunningham |
| 4,655,486 A | 4/1987 | Tarnay et al. |
| 4,676,533 A | 6/1987 | Gerondale |
| 4,717,179 A | 1/1988 | Haberstock et al. |
| 4,722,558 A | 2/1988 | Badoureaux |
| 4,747,626 A | 5/1988 | Hama et al. |
| 4,749,214 A | 6/1988 | Hoskins et al. |
| 4,777,669 A | 10/1988 | Rogus |
| 4,875,709 A | 10/1989 | Caroll et al. |
| 4,890,865 A | 1/1990 | Hosono et al. |
| 4,911,406 A | 3/1990 | Attwood |
| 5,052,723 A | 10/1991 | Bartholomew |
| 5,094,467 A | 3/1992 | Lagabe |
| 5,160,179 A | 11/1992 | Takagi |
| 5,174,331 A | 12/1992 | Steudler, Jr. |
| 5,205,568 A | 4/1993 | Stoll et al. |
| 5,439,258 A | 8/1995 | Yates |
| 5,496,076 A | 3/1996 | Lin |
| 5,527,073 A | 6/1996 | Readman |
| 5,553,901 A | 9/1996 | Serot |
| 5,621,191 A | 4/1997 | Norris et al. |
| 5,681,062 A | 10/1997 | Fukao et al. |
| 5,695,224 A | 12/1997 | Grenier |
| 5,722,702 A | 3/1998 | Washburn |
| 5,782,570 A | 7/1998 | Masterson et al. |
| 5,799,985 A | 9/1998 | Murphy |
| 6,347,785 B1 | 2/2002 | Copp et al. |
| 6,464,266 B1 | 10/2002 | O'Neill et al. |
| 6,663,145 B1 | 12/2003 | Lyall, III et al. |
| 6,685,230 B1 | 2/2004 | Bottura |
| 6,783,161 B2 | 8/2004 | Halama |
| 6,860,523 B2 | 3/2005 | O'Neill et al. |
| 7,232,159 B2 | 6/2007 | O'Neill et al. |
| 7,523,966 B2 | 4/2009 | O'Neill et al. |
| 7,717,475 B2 | 5/2010 | Savelle, Jr. et al. |
| 7,810,850 B2 | 10/2010 | O'Neill et al. |
| 8,820,799 B2 | 9/2014 | O'Neill et al. |
| 9,322,499 B2 | 4/2016 | Guest |
| 2003/0067170 A1 | 4/2003 | Snyder et al. |
| 2003/0116960 A1 | 6/2003 | Yates |
| 2004/0021318 A1 | 2/2004 | Fritze et al. |
| 2004/0070198 A1 | 4/2004 | Rohrig |
| 2004/0155464 A1 | 8/2004 | Slattsveen |
| 2004/0239115 A1 | 12/2004 | Wilk et al. |
| 2006/0208213 A1 | 9/2006 | Turnau et al. |
| 2012/0247513 A1 | 10/2012 | Johnson |
| 2014/0311614 A1 | 10/2014 | Edmondson et al. |
| 2015/0076816 A1 | 3/2015 | O'Neill et al. |
| 2015/0159794 A1 | 6/2015 | Bobo et al. |
| 2015/0240571 A1 | 8/2015 | Bowles |

FOREIGN PATENT DOCUMENTS

| | | |
|---|---|---|
| EP | 610538 A1 | 8/1994 |
| GB | 1520150 A | 8/1978 |
| GB | 2280006 A | 1/1995 |
| GB | 2390882 B | 9/2005 |
| GB | 2505420 A | 3/2014 |
| WO | 9700314 A1 | 1/1997 |
| WO | 0036327 A1 | 6/2000 |
| WO | 2010136606 A1 | 12/2010 |

US 10,865,923 B2

PUSH-FIT FITTING AND END BUSHING FOR USE THEREWITH

BACKGROUND OF THE INVENTION

Field of the Invention

The present invention is directed generally to push-fit type fittings, such as elbows, tees, test caps, couplers, supply stop valves, or other style valves or fittings, to permit a push-fit connection of a pipe to a push-fit fitting. The present invention is particularly useful with push-fit fittings using a metal body.

Description of the Related Art

As is apparent to those of ordinary skill in the art, push-fit fittings such as valves, for example, a supply stop valves, typically have an input port with gripper rings to receive a water supply pipe to accomplish a push-fit connection to the pipe and an output port to which a standard flexible hose is connected such that water passing through the supply stop valve is delivered to a water tank of a toilet, a washing machine, an ice maker, a dishwasher or other appliance or equipment. Push-fit fittings such as valves using a metal body are typically made of brass and some have the outer end portion of their body rolled to retain an end bushing within the body, and hence also the O-ring, spacer bushings and gripper rings, when operating with significant interior fluid pressure. However, using a rolled end portion of the body sidewall at the open end of the body into which the end bushing and other components are inserted present a problem since operation under fluid pressure can result in the body being work hardened and cracking. In addition, when brass fittings are in contact with the ground, dezincification of the rolled end portion can result and weaken the housing.

In view of the above, and for other reasons noted herein, a need exists for a push-fit fitting with a metal body which does not require rolling the body to retain the end bushing and other components within the body and preferably allows reliable operation at increased interior fluid pressures.

BRIEF DESCRIPTION OF THE SEVERAL VIEWS OF THE DRAWING(S)

Figure 4:
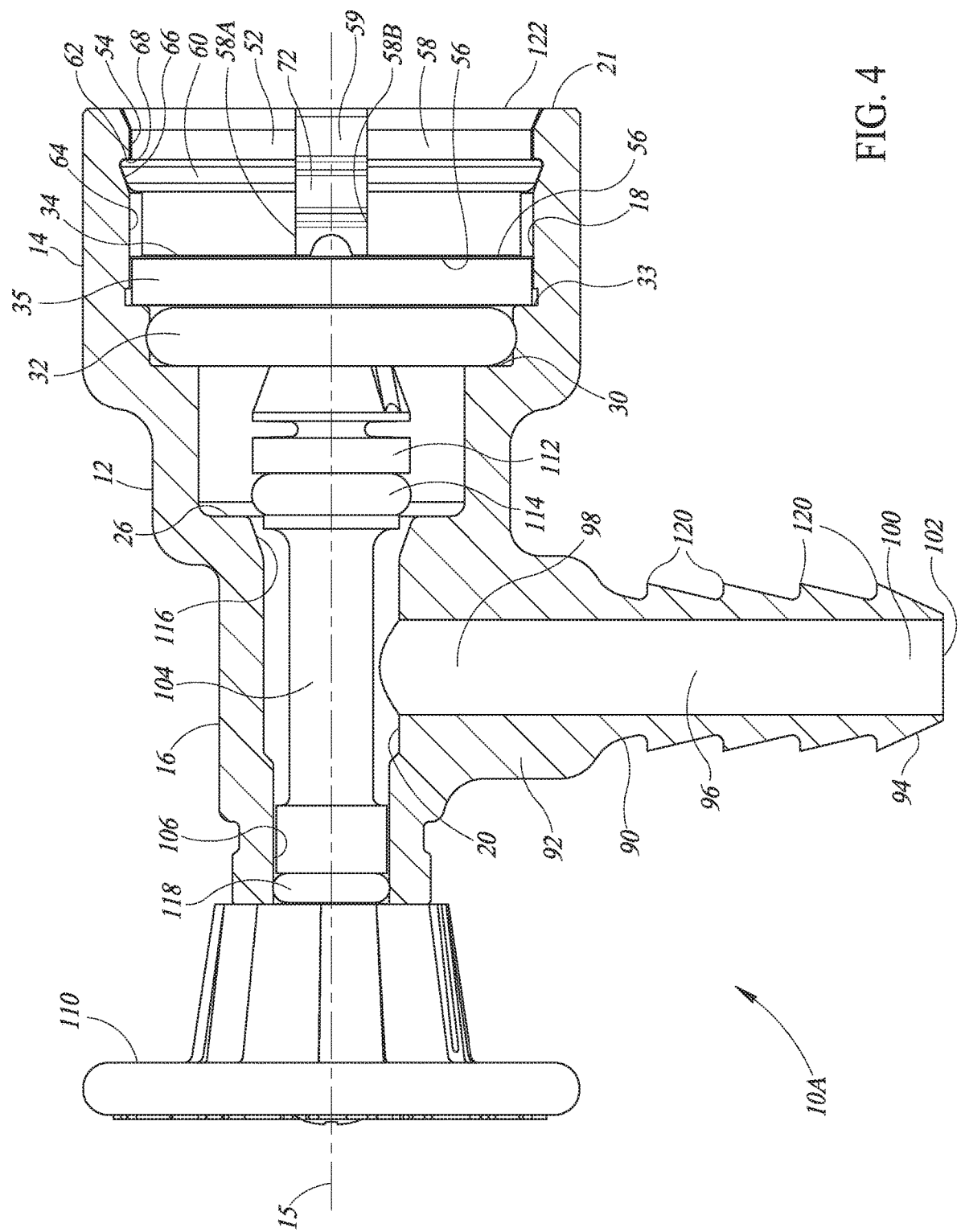
FIG. 4 is a cross-section side elevational view of the valve of FIG. 1 using a single gripper ring and a single spacer bushing.
Figure 6:
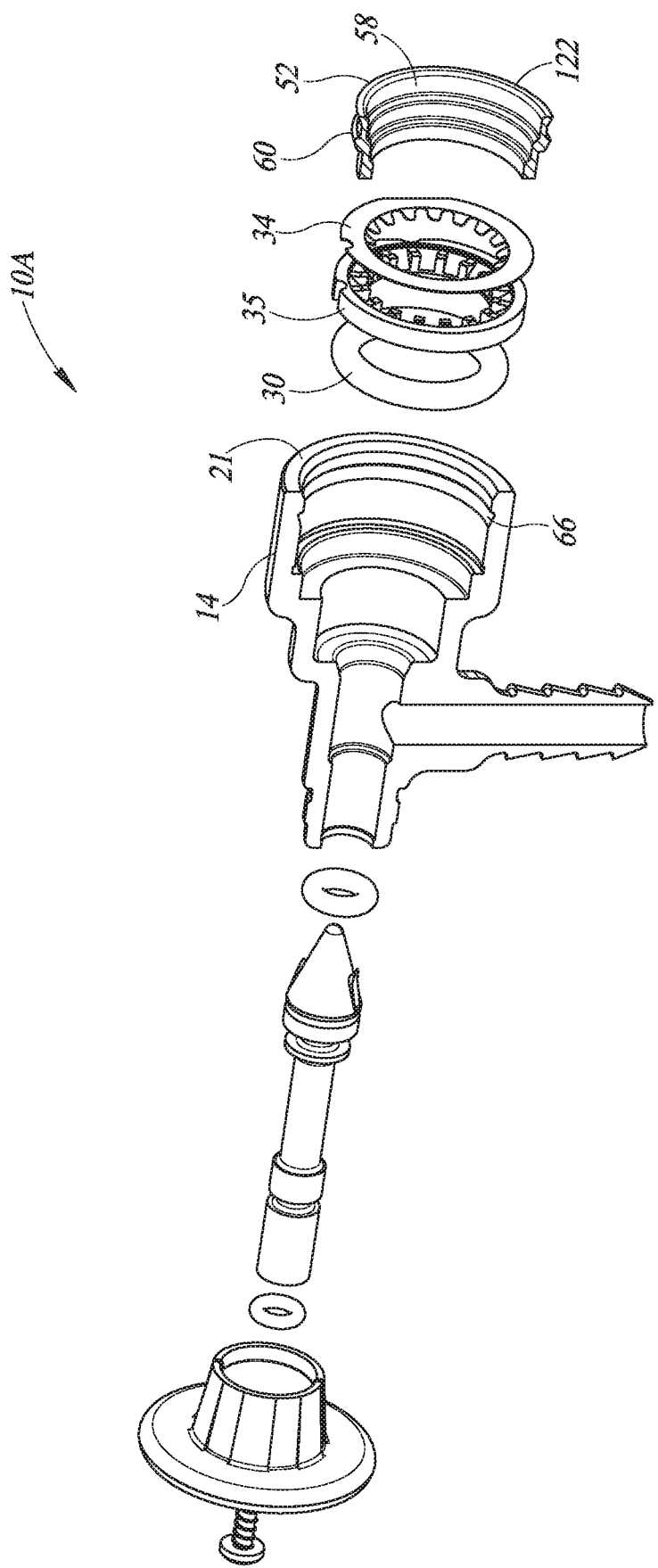

FIG. 6 a second exploded view of the valve of FIG. 4.

Figure 2:
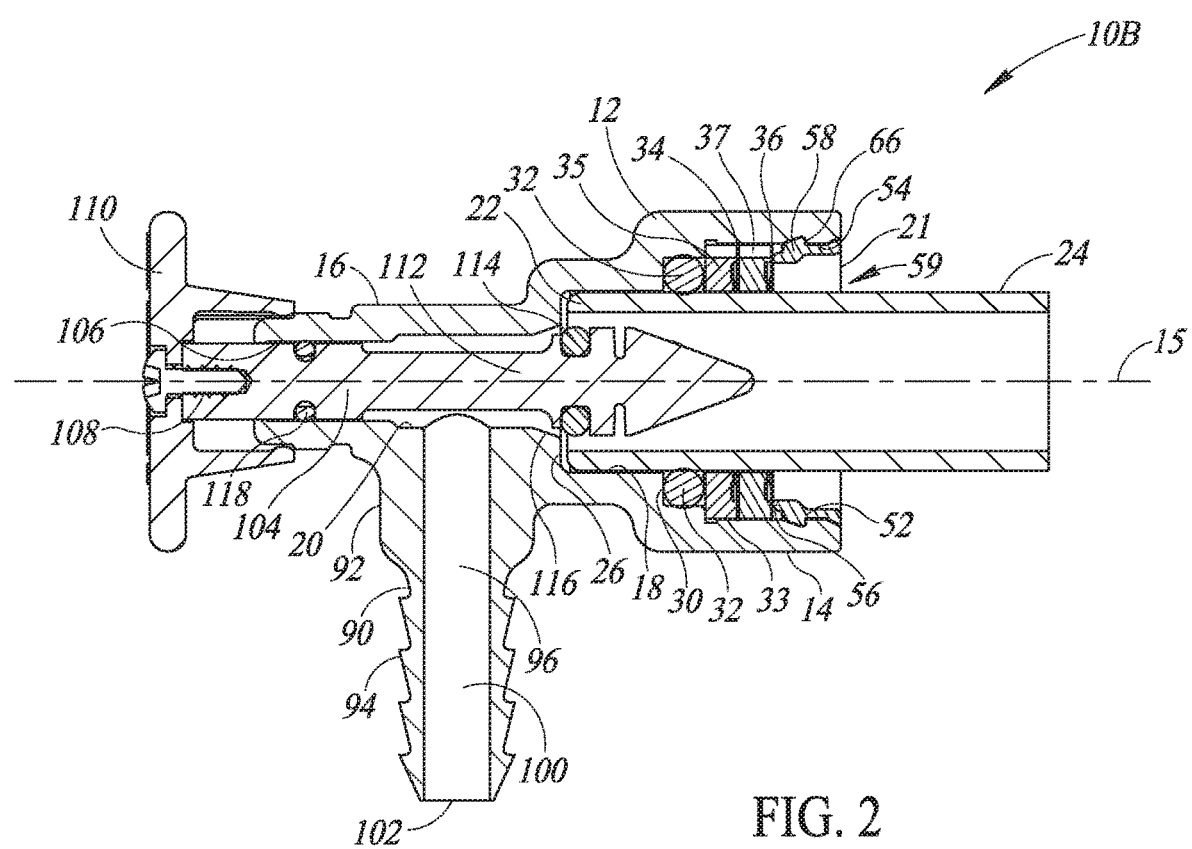
FIG. 2 is a cross-section side elevational view of the valve of FIG. 1 using two gripper rings and spacer bushings.
Figure 3:
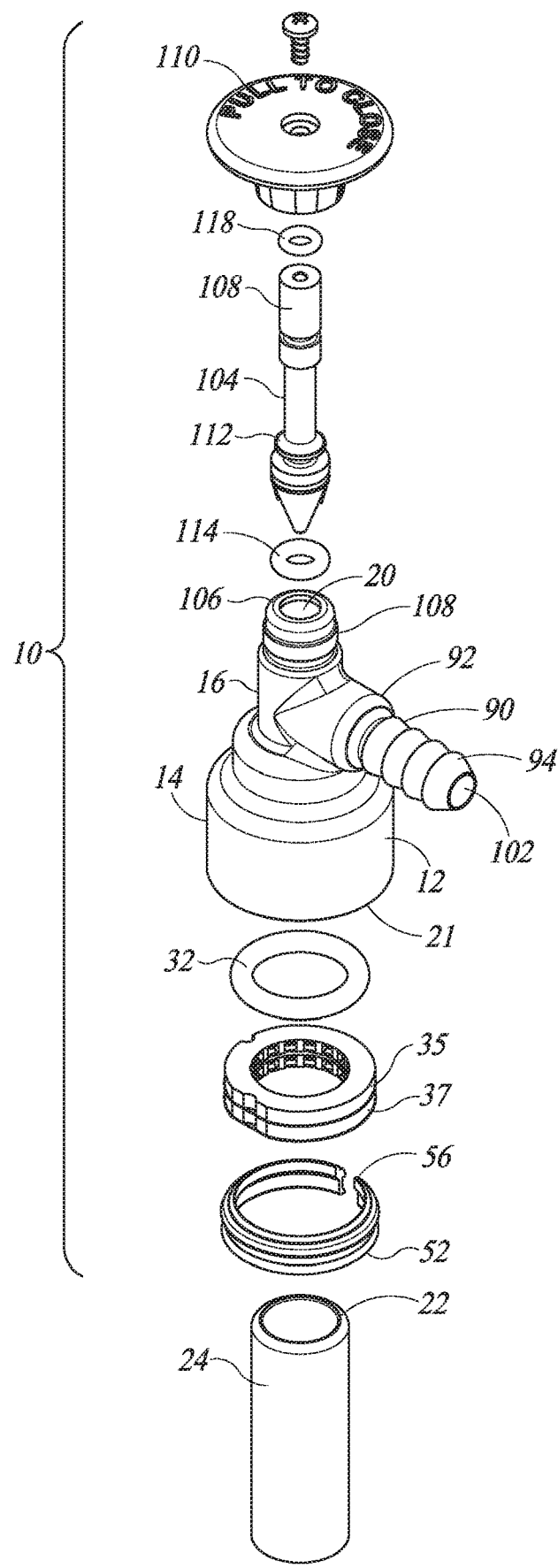
FIG. 3 is an exploded view of the valve of FIG. 2.
Figure 7:
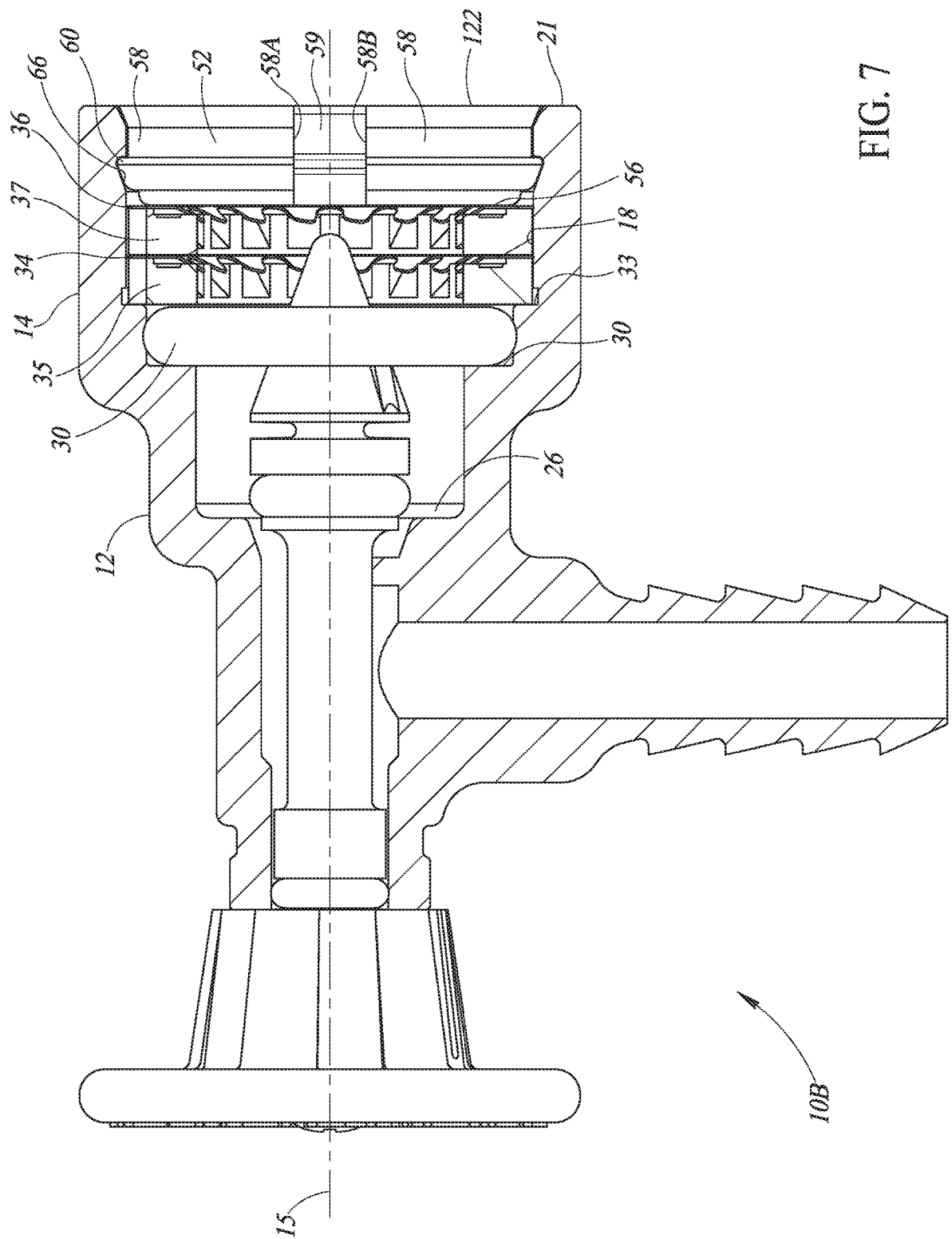

FIG. 7 is a cross-sectional side elevational view of the valve of FIG. 2.

Figure 8:
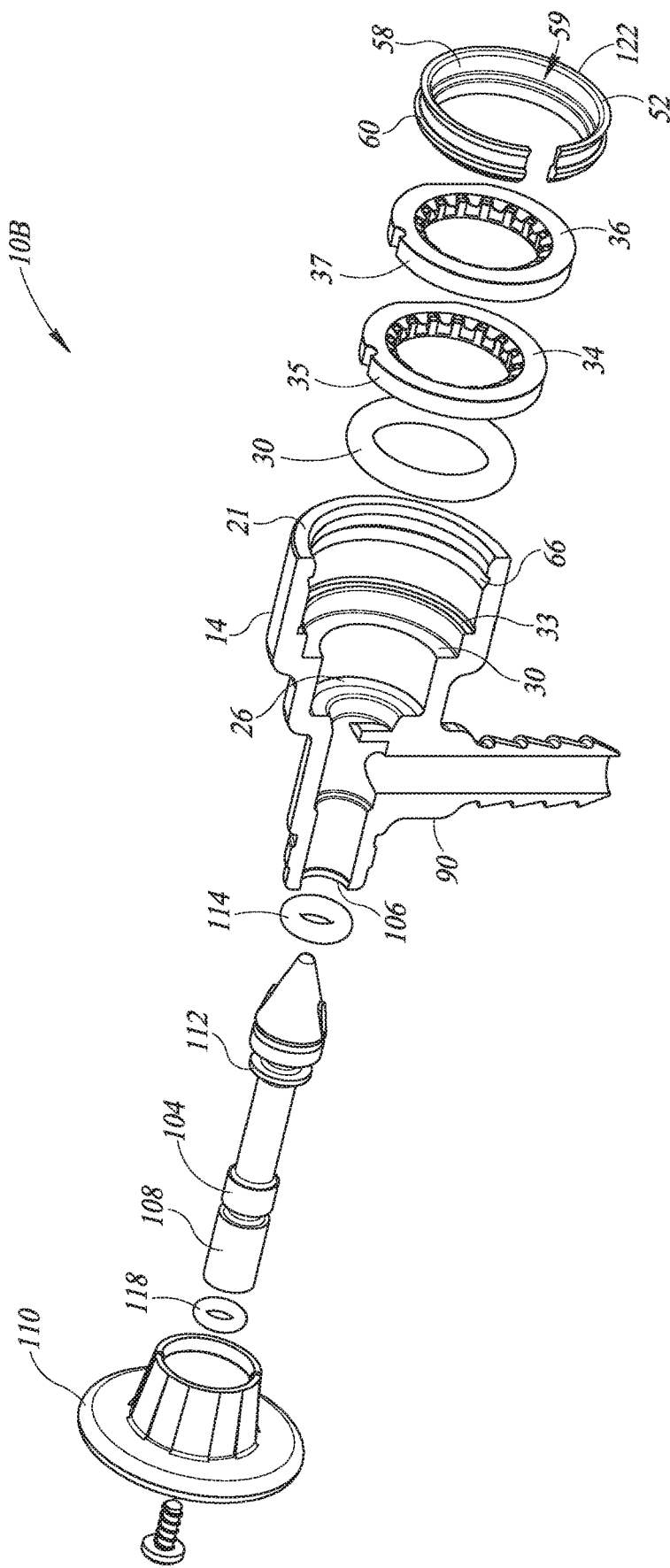

FIG. 8 is an exploded view of the valve of FIG. 7.

Figure 1:
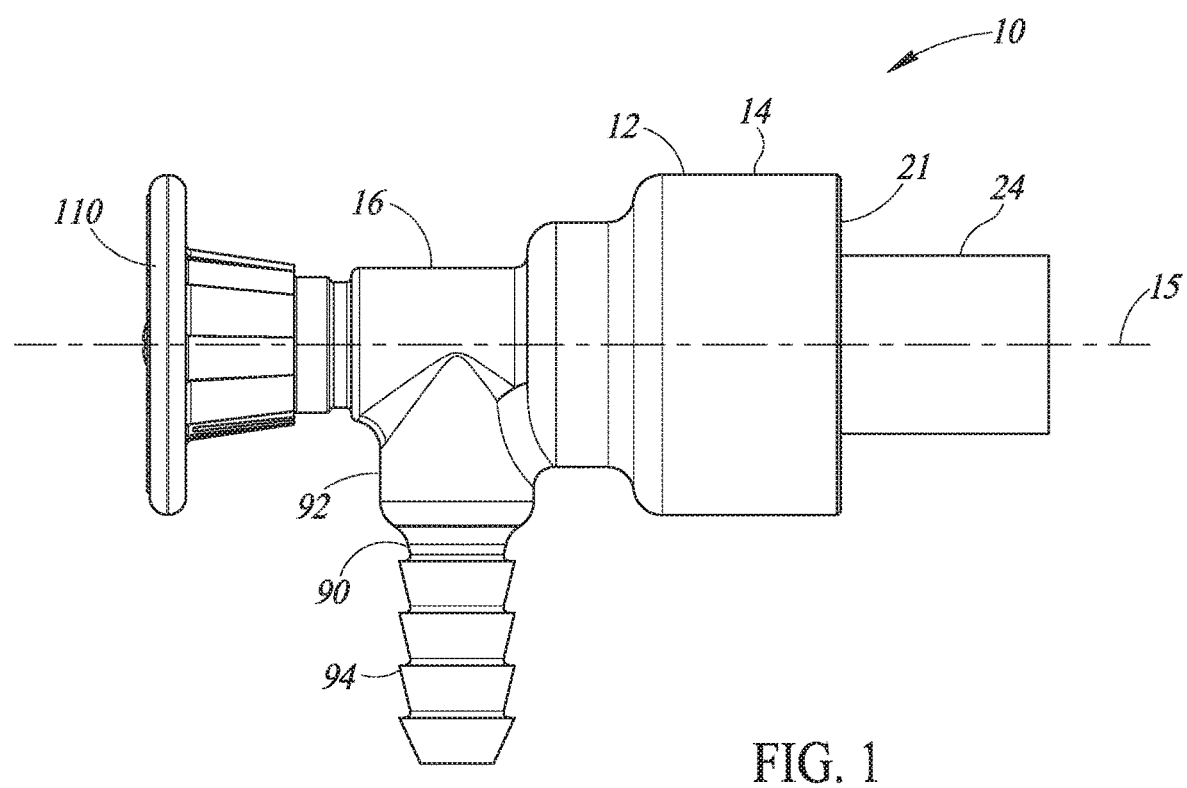
FIG. 1 is a side elevational view of a push-fit valve of the present invention.
Figure 9:
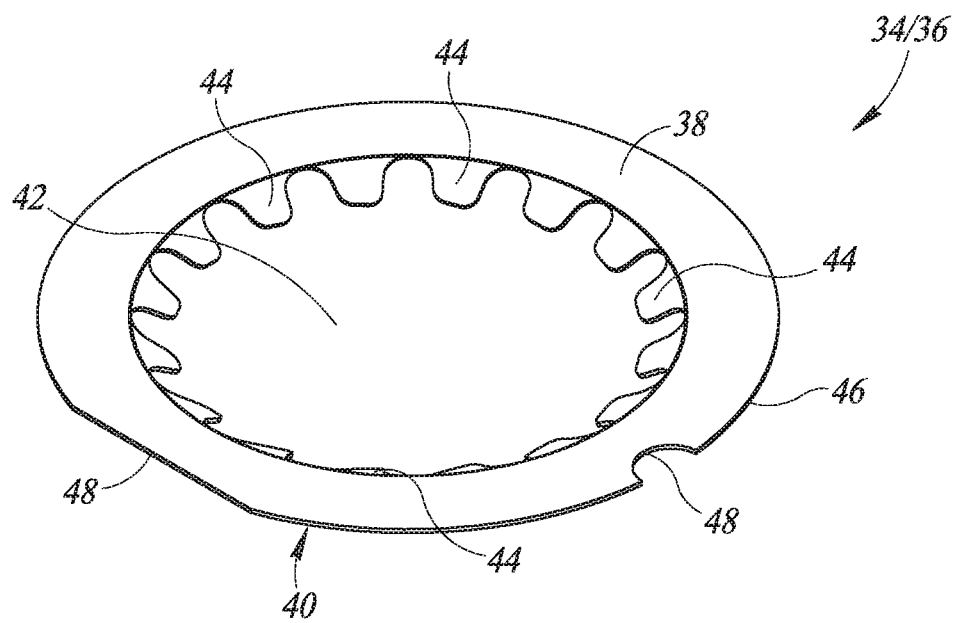

FIG. 9 is a top perspective view of a gripper ring used with the valve of FIG. 1.

Figure 10:
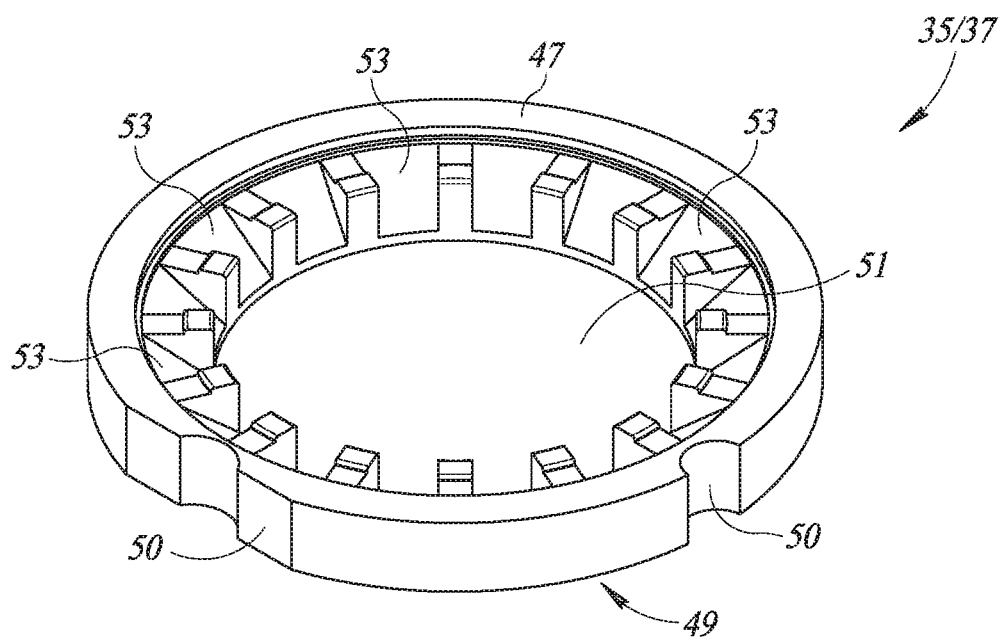

FIG. 10 a top perspective view of a spacer bushing used with the valve of FIG. 1.

Figure 11:
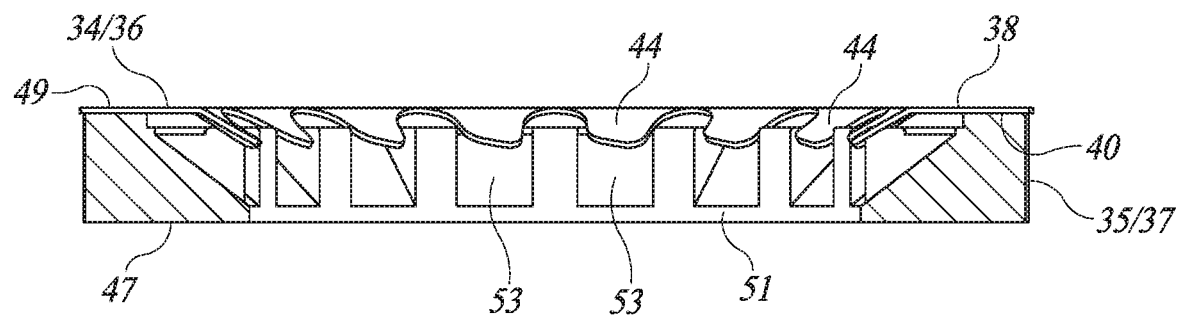

FIG. 11 is a cross-sectional side elevational view of the spacer bushing of FIG. 10 assembled with the gripper ring of FIG. 9, for use in the valve of FIG. 1.

Figure 12:
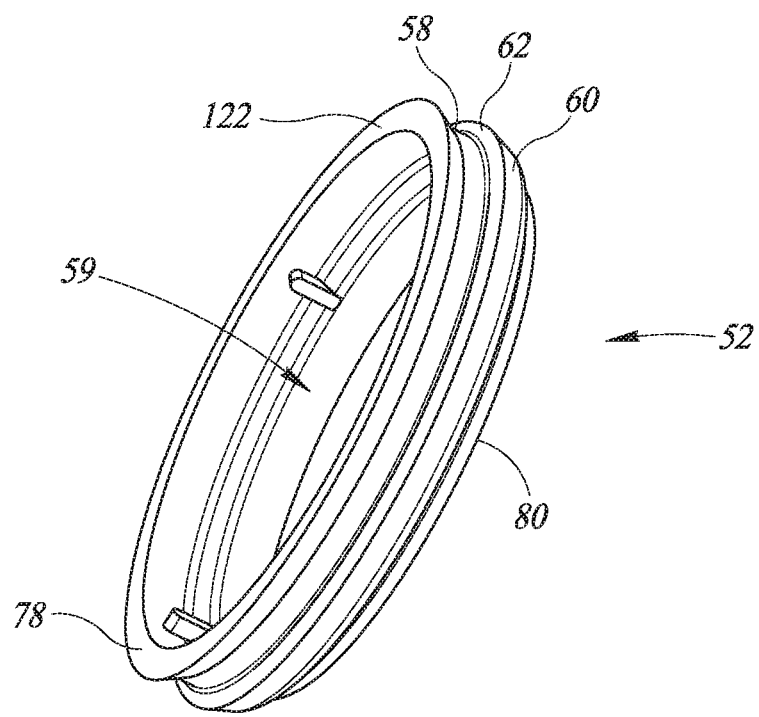

FIG. 12 is a perspective view of an end busing usable with the valve of FIG. 1 and having a continuous perimeter sidewall.

Figure 13:
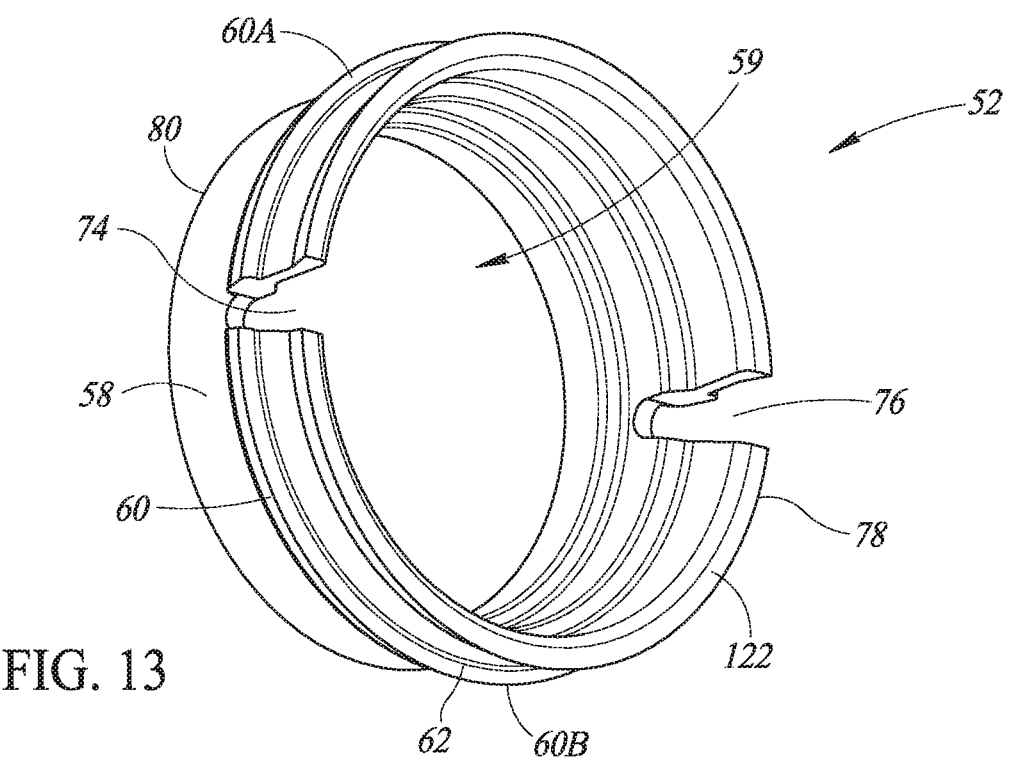

FIG. 13 is perspective view of an end bushing usable with the valve of FIG. 1 and having two partial gaps in the perimeter sidewall.

Figure 14:
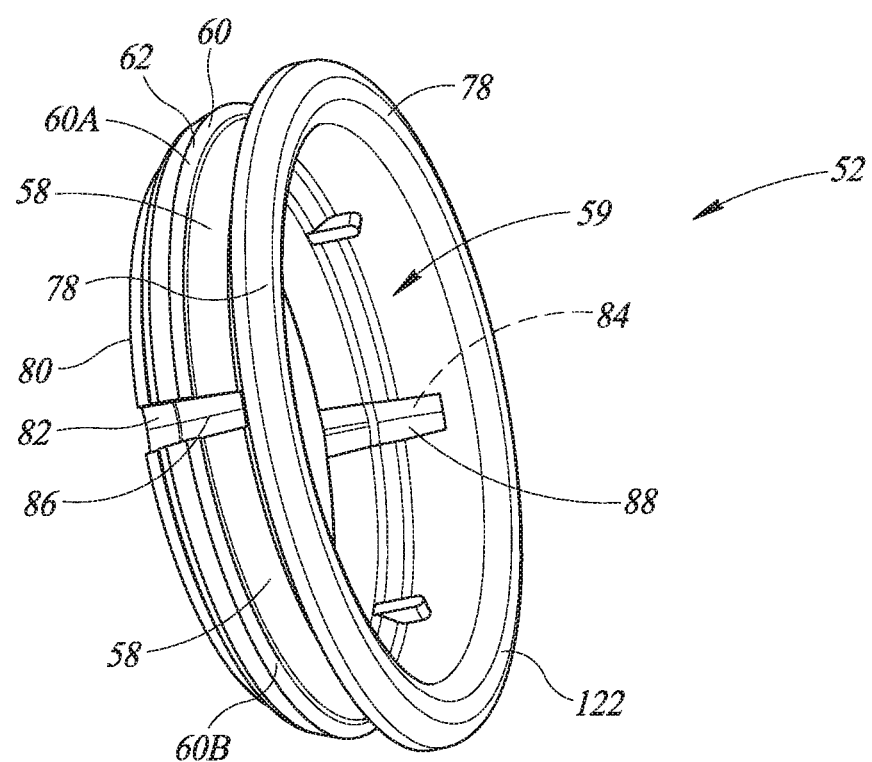

FIG. 14 is a perspective view of an end bushing usable with the valve of FIG. 1 and having a continuous perimeter sidewall with grooves.

Figure 15:
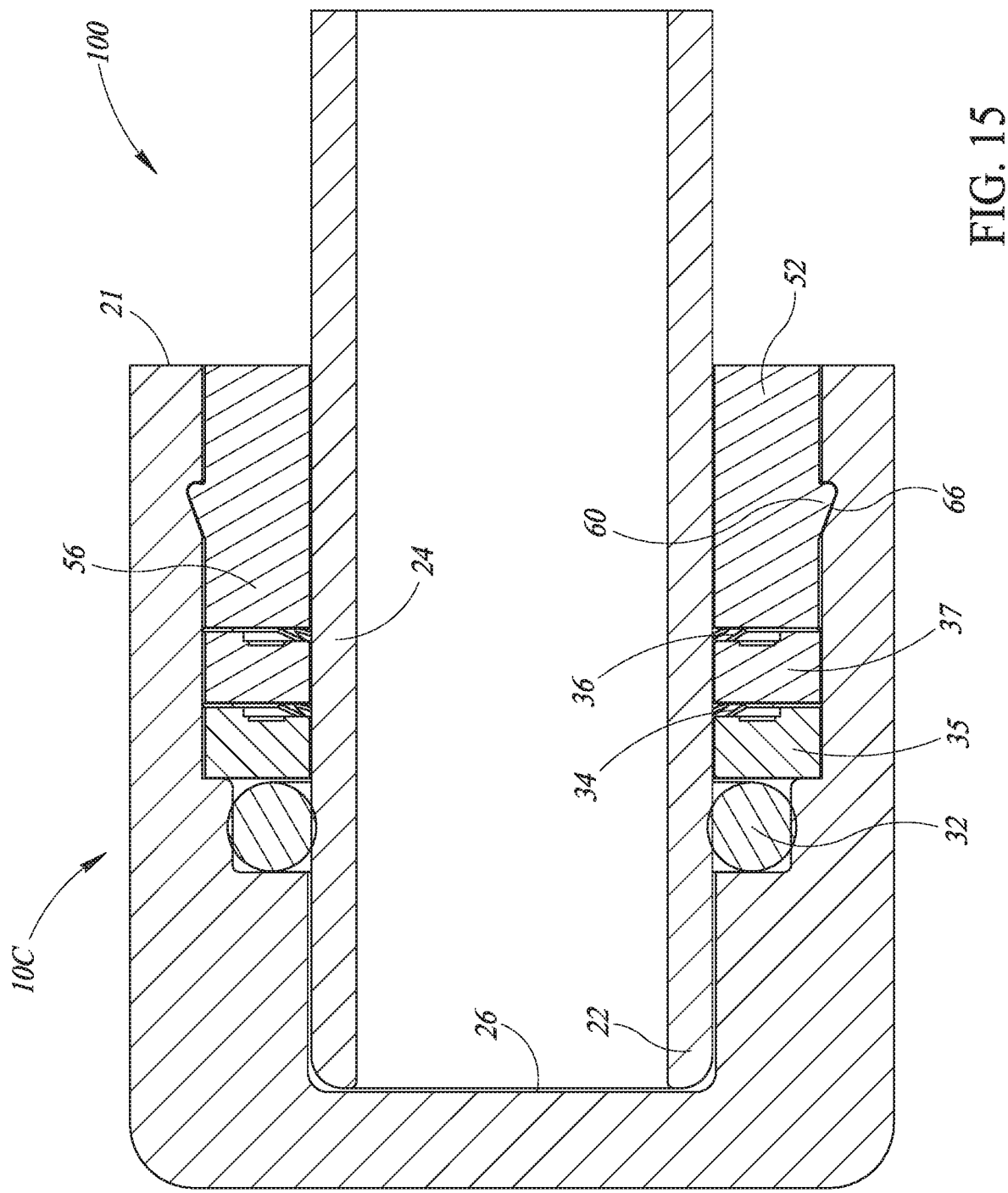

FIG. 15 is a cross-section side elevational view of a push-fit test cap of the present invention.

Like reference numerals have been used in the figures to identify like components.

DETAILED DESCRIPTION OF THE INVENTION

A push-fit plumbing fitting 10 of the present invention is illustrated as a supply stop valve in FIG. 1. A first embodiment of the push-fit fitting 10 of the present invention is illustrated as a supply stop valve 10A in FIGS. 4, 5 and 6, and a second embodiment of the push-fit fitting of the present invention is illustrated as a supply stop valve 10B in FIGS. 2, 3, 7 and 8, although the present invention may comprise other styles of push-fit fittings, such as elbows, tees, test caps, couplers, and other style valves and fittings.

The valve 10A has a metal housing 12, typically made of brass, with a first housing portion 14 having a longitudinal axis 15 and a second housing portion 16 in coaxial arrangement. The first housing portion 14 has a first axial chamber or bore 18 and the second housing portion 16 has a second axial chamber or bore 20 in coaxial arrangement with the first axial bore. The inward end portion of the first axial bore 18 is in fluid communication with the inward end portion of the second axial bore 20. The outer end portions of the first axial bore 18 and the second axial bore 20 are open.

As illustrated in FIG. 2 for the valve 10B, the first axial bore 18 is sized to receive therein, through an open outer end 21 of the first axial bore, a pipe free-end portion 22 of a smooth outer walled pipe 24. At the inward end portion of the first axial bore 18 there is an inward first shoulder 26 sized to engage an outer end wall 28 of the pipe free-end portion when inserted fully into the first axial bore to limit inward movement of the pipe. The first axial bore 18 further includes a second shoulder 30 positioned outward of the first shoulder 26 at which an O-ring 32 is positioned. The second shoulder 30 holds the O-ring 32 against inward movement. The O-ring 32 is sized to receive the pipe free-end portion 22 therethrough and provide a fluid-tight seal between the outer wall of the pipe free-end portion and the inner wall of the first axial bore 18. A third shoulder 33 is positioned outward of the second shoulder 30 and outward of the O-ring 32.

A first gripper ring 34 and a first spacer bushing 35 are positioned outward of the O-ring 32 with the first spacer bushing against the third shoulder 33 which holds the first spacer bushing against inward movement. In the embodiment of valve 10B illustrated in FIG. 2, a second gripper ring 36 and a second spacer bushing 37 are positioned outward of the first gripper ring 34 and first spacer bushing 35, all being arranged in coaxial alignment. As shown in FIGS. 9 and 11, each of the first and second gripper rings 34 and 36 includes outward and inward facing circumferentially extending smooth perimeter wall portions 38 and 40, respectively, having a central through-hole 42 through which the pipe free-end portion 22 may be inserted and a plurality of circumferentially spaced, axially and radially inwardly protruding teeth 44 that extend into the central through-hole and grip the pipe free-end portion 22 when inserted therein. The teeth 44 grip the pipe free-end portion 22 to prevent its unintentional withdrawal during use.

An outer circumferential edge wall 46 of each of the first and second gripper rings 34 and 36 may include one or more keyways 48 to engage longitudinally extending keys (not shown) on the inner wall of the first axial bore 18 to prevent rotation of the gripper ring within the first axial bore. As shown in FIG. 10, each of first and second spacer bushings 35 and 37 may also include one or more keyways 50 to engage the same longitudinally extending keys on the inner wall of the first axial bore 18 to prevent rotation of the spacer bushings and hence also the gripper rings within the first axial bore.

The gripper rings 34 and 36 are made of metal and the teeth 44 may each be provided with a twist in a common direction such that the forward most edge of the teeth is bent at an angle to allow the pipe free-end portion 22 of the pipe 24 to be slid past the sharp edges of the ends of the teeth for easy insertion into the first axial bore 18 past the first and second gripper rings 34 and 36 and the O-ring 32. The teeth 44 will bite into the tubular conduit to prevent its retraction a straight line (i.e., without twisting) and hence securely hold the pipe free-end portion 22 within the first axial bore during normal usage of the valve 10. However, the bent teeth 44 permit the pipe free-end portion 22 to be easily removed from the first axial bore 18 by rotating the pipe free-end portion to effectively unscrewing from the valve 10.

As best seen in FIG. 10, each of the first and second spacer bushings 35 and 37 has outward and inward facing circumferentially extending smooth perimeter wall portions 47 and 49, respectively, and a central through-hole 51 through which the pipe free-end portion 22 may be inserted. Each spacer bushing further includes circumferentially spaced axial grooves 53, each with one of the circumferentially spaced teeth 44 of the gripper ring positioned therein.

Figure 5:
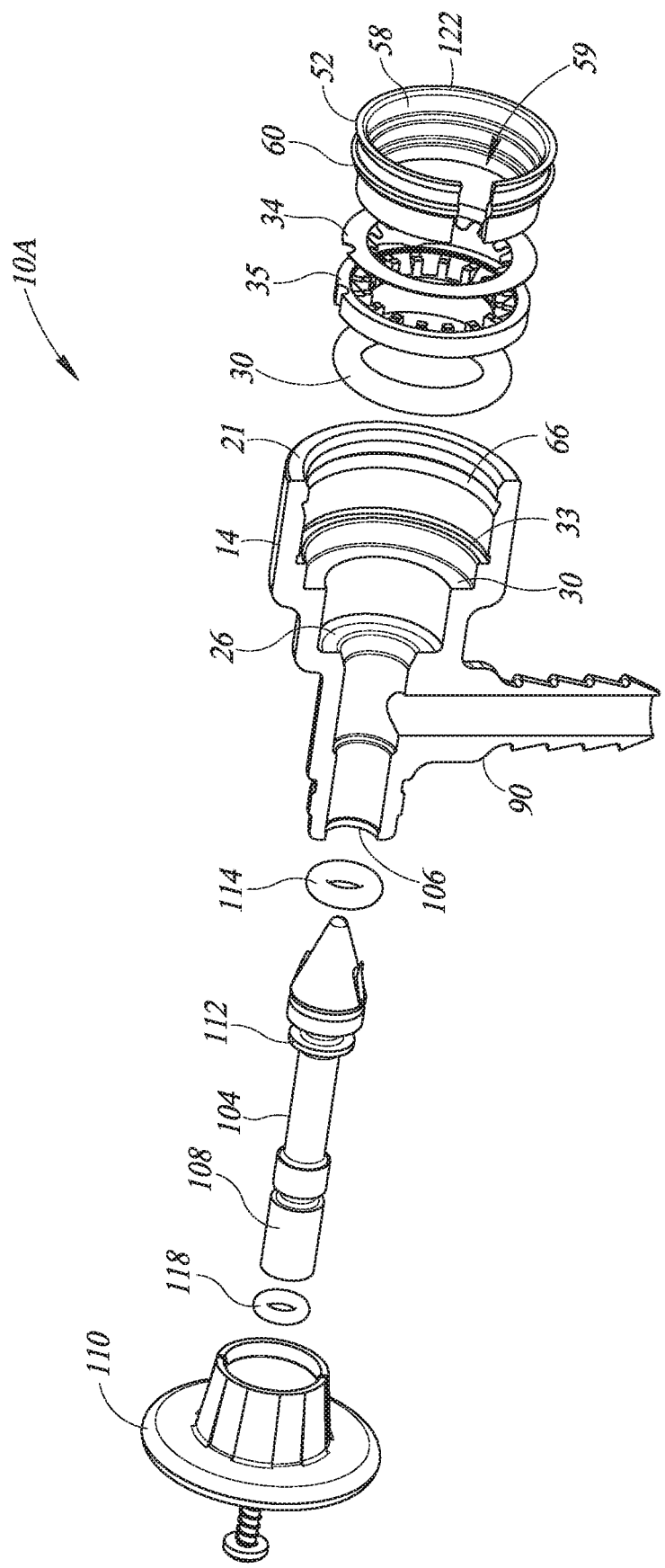
FIG. 5 is an exploded view of the valve of FIG. 4.

FIGS. 4, 5 and 6 show the first gripper ring 34 of valve 10A assembled with the first spacer bushing 35. FIGS. 2, 3, 7 and 8 show the first gripper ring 34 of valve 10B assembled with the first spacer bushing 35 and the second gripper rings 36 assembled with the second spacer bushing 37. The inward facing perimeter wall portion 49 of the first spacer bushing 35 is in seated engagement with the O-ring 32 in both valves 10A and 10B, and in valve 10B, the inward perimeter wall portion 49 of the second spacer bushing 37 is in seated engagement with the outward facing perimeter wall portion 38 of the first gripper ring 34.

It is to be understood that the push-fit fitting 10, whether it be a valve or other style of push-fit fitting, may use more than a single O-ring and may use a single gripper ring or more than two gripper rings to achieve the desired seal with and grip on the pipe free-end portion 22. Further, the O-rings and gripper rings may be in different sequential positions within the first axial bore 18. Further, while the push-fit fitting 10 is described as being used with the pipe 24, the pipe may have a hard sidewall or have a soft sidewall such as does PEX and PE-RT tubing and tubing made of other materials.

An annular end bushing 52 is positioned in an open end portion 54 of the first axial bore 18 and secured to the first housing portion 14 to retain the O-ring 32 and one or both of the first and second gripper rings 34 and 36 within the first axial bore 18. In valve 10A, the end bushing 52 extends inward of the axial bore 18 sufficiently that an inward circumferentially extending end portion 56 of the end bushing engages the outer perimeter wall portion 40 of the first gripper ring 34, and in valve 10B engages the outer perimeter wall portion 40 of the second gripper ring 36, to hold the one or more gripper rings, and the one or more spacer bushings tightly sandwiched together between the third shoulder 33 and the inward end portion 56 of the end bushing 52. It also limits axial movement of the O-ring 32 which is positioned between the second shoulder 30 and the first spacer bushing 35.

The end bushing 52 has a perimeter sidewall 58 defining an interior axially extending passageway 59, and an inwardly projecting, exterior circumferentially extending locking member or rib 60. The rib 60 extend circumferentially orthogonal to the axis 15. The rib 60 slopes outwardly in the rearward axial direction and terminates in a rearwardly facing transverse end wall 62 which extends circumferentially about the sidewall. An interior housing wall 64 of the first housing portion 14 has an interior circumferentially extending groove 66 which extends circumferentially orthogonal to the axis 15. The groove 66 slopes outwardly in the rearward axial direction and terminates in a forwardly facing transverse end wall 68 which extends circumferentially about the interior housing wall. The rib 60 of the end bushing 52 is sized to fit snuggly within the groove 66 of the first housing portion 14, with the end wall 62 of the end bushing in abutting face-to-face juxtaposition with the end wall 68 of the first housing portion to inhibit rearward axial movement of the end bushing within the first housing portion, particularly when the valves 10A and 10B are operating to control the flow of pressurized fluid through the valves. This is accomplished without the need to use a threaded connection between the end bushing 52 and the first housing portion 14.

While the housing 12 and particularly the first housing portion 14 is typically made of brass and thus has a fairly high strength, the end bushing 52 is typically made of a plastic and inherently has a higher degree of flexibility and softness, and less strength compared to brass. The flexibility and softness of the end bushing 52 facilitates its insertion through the open end portion 54 of the first axial bore 18 to position the rib 60 of the end bushing 52 within the groove 66 of the first housing portion 14 during assembly of the valves 10A and 10B. However, during sufficiently high pressure operation of the valves, the interior fluid pressure tends to apply a force on the end bushing 52, potentially causing the rib 60 to dislodge from the groove 66 and the end bushing blown out the open end portion 54 of the first axial bore 18, thus presenting the danger of valve failure and fluid leakage.

To more securely hold the rib 60 within the groove 66 under pressurized operation of the valves, the inner diameter of the interior passageway 59 of the perimeter sidewall 58 of the end bushing 52 is sized to substantially match the outer diameter of the free-end portion 22 of the pipe 24 which is to be received through the passageway and extend into the first axial bore 18 of the first housing portion 14. The substantial matching of the inner diameter of the passageway 59 of the end bushing 52 and the outer diameter of the pipe 24 results in the strength of the pipe sidewall and the fluid pressure within the pipe reinforcing the end bushing and resisting the radially inward forces applied to the end bushing to prevent radially inward flexing and movement of the perimeter sidewall 58 of the end bushing sufficient to dislodge the rib 60 from the groove 66, while allowing manufacture of the end bushing from a material which is flexible and soft enough to facilitate insertion of the end bushing into the first housing portion 14 during assembly of the valves. The construction described permits the valves to operate with fluid pressures up to and perhaps in excess of 1,000 psi. Thus, the end bushing 52 is retained within the first housing portion 14 under high pressure operation of the valves more securely than with typical methods of securing a push-fit fitting end bushing with the fitting housing, while maintaining the ease of valve assembly. This permits manufacture of the end bushing 52 from CPVC, Acetal, Polysulfone or Nylon, various other engineered polymers, and other suitable materials. The construction described also eliminates the need to roll over the outer end 21 of the first axial bore 18 of the metal first housing portion 14 as done in some prior art push-fit fittings to provide a circumferential stop wall to retain the end bushing within the housing.

An end bushing 52 with a continuous perimeter sidewall 58 is shown in FIG. 12. With this construction, to insert the end bushing 52 through the open end portion 54 of the first axial bore 18 to secure it to the first housing portion 14 with the rib 60 within the groove 66 of the first housing portion, the end bushing is first positioned at the open end portion and then an axially inward insertion force is applied to the end bushing to press fit the end bushing into the open end portion. The end bushing 52, and particularly the perimeter sidewall 58 and the rib 60, should be made from a material which is flexible enough to permit the insertion and resilient enough that the perimeter sidewall and the rib will move radially outward sufficiently when fully insert to position the rib securely within the groove 66.

To facilitate more of a snap-in assembly when inserting the end bushing 52 through the open end portion 54 of the first axial bore 18 to position the rib 60 of the end bushing 52 within the groove 66 of the first housing portion 14 during assembly of the valves 10A and 10B, the end bushing may have alternative designs. A first alternative embodiment of the end bushing 52 is best shown in FIGS. 3-5, 7 and 8, and has a C-shaped perimeter sidewall 58. The perimeter sidewall 58 has first and second spaced apart sidewall ends 58A and 58B, respectively, which define a single gap 72 therebetween. The gap 72 is sufficiently wide that the overall diameter of the end bushing 52 will reduce as it is pressed into the open end portion 54 of the first axial bore 18 to require a smaller axially inward insertion force than with the continuous perimeter sidewall construction described above. Preferably, the perimeter sidewall 58 is made from a material which is flexible enough to permit the insertion and resilient enough that the perimeter sidewall 58 and the rib 60 will move radially outward sufficiently when fully insert to position the rib within the groove 66. This construction relies on the inner diameter of the interior passageway 59 of the perimeter sidewall 58 of the end bushing 52 being sized to substantially match the outer diameter of the free-end portion 22 of the pipe 24 which is to be received through the passageway and extend into the first axial bore 18 so that the pipe sufficiently resists the radially inward movement of the perimeter sidewall of the end bushing relative to the interior housing wall 64 of the first housing portion 14 that dislodging of the rib 60 from the groove 66 is prevented during pressurized operation of the valves 10A and 10B.

A second alternative embodiment of the end bushing 52 is shown in FIG. 13, and has two diametrically opposed, axially extending partial gaps 74 and 76 in the perimeter sidewall 58. The gaps 74 and 76 extend axially partially from an axially outer end 78 of the perimeter sidewall 58 toward an axially inner end 80 of the perimeter sidewall, with the gaps extending through the rib 60 to divide the rib into two separated circumferentially extending rib segments 60A and 60B, each with ends which are separated from the ends of the other rib segment. The gaps 74 and 76 are sufficiently wide that the overall diameter of the end bushing 52 will reduce as it is pressed into the open end portion 54 of the first axial bore 18 to require a smaller axially inward insertion force than with the continuous perimeter sidewall construction described above. Preferably, the perimeter sidewall 58 is made from a material which is flexible enough to permit the insertion and resilient enough that the perimeter sidewall 58 and the rib 60 will move radially outward sufficiently when fully insert to position the rib segments 60A and 60B within the groove 66. This construction also relies on the inner diameter of the interior passageway 59 of the perimeter sidewall 58 of the end bushing 52 being sized to substantially match the outer diameter of the free-end portion 22 of the pipe 24 which is to be received through the passageway and extend into the first axial bore 18 so that the pipe sufficiently resists the radially inward forces applied to the end bushing to sufficiently limit flexing and movement of the perimeter sidewall of the end bushing that dislodging of the rib segments 60A and 60B from the groove 66 is prevented during pressurized operation of the valves 10A and 10B.

A third alternative embodiment of the end bushing 52 is shown in FIG. 14, and has two diametrically opposed, axially extending partial slots or grooves 82 and 84 in the perimeter sidewall 58. The grooves 82 and 84 in the perimeter sidewall 58 are not so deep as to form gaps and thus leave thinner walled portion 86 and 88, respectively, so that while the perimeter sidewall is continuous, the sidewall regions at the grooves are more flexible than the continuous perimeter sidewall construction described above. The grooves 82 and 84 extend axially partially from the axially inner end 80 of the perimeter sidewall 58 toward the axially outer end 78 of the perimeter sidewall, and extend through the rib 60 to divide the rib into two separated circumferentially extending rib segments 60A and 60B, each with ends which are separated from the ends of the other rib segment. The grooves 82 and 84 are sufficiently wide that the overall diameter of the end bushing 52 will reduce as it is pressed into the open end portion 54 of the first axial bore 18 to require a smaller axially inward insertion force than with the continuous perimeter sidewall construction described above. Preferably, the perimeter sidewall 58 is made from a material which is flexible enough to permit the insertion and resilient enough that the perimeter sidewall 58 and the rib 60 will move radially outward sufficiently when fully insert to position the rib segments 60A and 60B within the groove 66. This construction also relies on the inner diameter of the interior passageway 59 of the perimeter sidewall 58 of the end bushing 52 being sized to substantially match the outer diameter of the free-end portion 22 of the pipe 24 which is to be received through the passageway and extend into the first axial bore 18 so that the pipe sufficiently resists the radially inward forces applied to the end bushing to sufficiently limit flexing and movement of the perimeter sidewall of the end bushing that dislodging of the rib segments 60A and 60B from the groove 66 is prevented during pressurized operation of the valves 10A and 10B.

While the groove 66 is described and illustrated as being in the interior housing wall 64 of the first housing portion 14, and the rib 60 is described and illustrated as being part of the perimeter sidewall 58 of the end bushing 52, in alternative embodiments not illustrated, the groove 66 may be in the perimeter sidewall 58 of the end bushing 52, and the rib 60 part of the interior housing wall 64 of the first housing portion 14.

Again referring to FIGS. 1-8, a third housing portion 90 has an inward end portion 92 and an outward end portion 94, and a fluid channel 96 extending fully therethrough. The fluid channel 96 has an inward end channel portion 98 in fluid communication with the second axial bore 20 of the second housing portion 16, at a midportion of the second housing portion, and an outward end channel portion 100 terminating with an output fluid port 102. The third housing portion 90 is arranged perpendicular to the axially aligned first and second housing portions 14 and 16, but it is to be understood that other arrangements of the housing portions is possible. Further, while the first, second and third housing portions 14, 16 and 90 of the housing 12 are formed as an integral unit, it is to be understood that the housing portions may be formed as separate component temporarily or permanently connected together for use.

The valves 10A and 10B utilizes a valve element which includes a valve stem 104 axially movable within the second housing portion 16 between a valve opened position and a valve closed position. The valve stem 104 extends outward of the second housing portion 16 through a second housing portion opening 106 and has an outer end portion 108 positioned outward of the second housing portion with an actuator 110, also comprising part of the valve element, attached thereto which is grippable by a user to manually move the valve stem between the valve opened and valve closed positions. An inward end 112 of the valve stem 104 is positioned within the second housing portion 16 and has a first valve stem O-ring 114 mounted thereon which acts as a stopper and is part of the valve element, at a location inward of the inward end channel portion 98 of the fluid channel 96, for axial movement with the valve stem. When the valve stem 104 is pulled sufficiently outward by the actuator 110 into the valve closed position shown in FIG. 2, the first valve stem O-ring 114 is moved into sealingly engagement with a valve seat 116 formed on the inner wall of the second axial bore 20. A second valve stem O-ring 118 is mounted on the valve stem at a location outward of the inward end channel portion 98 of the fluid channel 96, for axial movement with the valve stem. The second valve stem O-ring 118 provides a fluid-tight seal between the valve stem 104 and the inner wall of the second housing portion 16 when the valve stem is in the valve opened position and the valve closed position, and all positions therebetween to prevent escape of fluid out of the second housing portion opening 106 at the outward end of the second axial bore 20.

When the valve stem 104 is pushed sufficiently inward by the actuator 110 into the valve opened position shown in FIGS. 4 and 7, the first valve stem O-ring 114 is moved out of sealingly engagement with the valve seat 116, thereby permitting fluid communication between the inward ends of the first and second axial bores 18 and 20 of the first and second housing portions 14 and 16. This allows the flow of fluid provided by the pipe 24 to flow to the inward end channel portion 98 of the fluid channel 96 for exit out of the outward end channel portion 100 through the output fluid port 102 of the third housing portion 90.

While the valves 10A and 10B are described as having a push-pull type operation, it is to be understood that other types of opening and closing mechanisms may be utilized, such as a quarter turn style valve mechanism.

An outer surface of the outward end portion 94 of the third housing portion 90 has circumferentially extending barbs 120 and is sized for insertion into a flexible hose or tube (not shown). The barbs 120 hold the hose or tube in place. Other clamps or fasteners may also be used. The other end of the hose or tube is typically attached to the fluid supply port of a fixture (not shown). Alternatively, a connector having an exteriorly threaded portion rather than barbs may be coaxially and rotatably mounted on the outward end portion 94 of the third housing portion 90. This is useful in washing machine valves for making a connection to a typical flexible washing machine water supply hose (not shown). One end of the hose is typically threadably attached to the connector and the other end of the utility hose is typically attached to the fluid supply port of a fixture (not shown), such as a washing machine. A split stop ring (not shown) may be used to prevent removal of the connector from the third housing portion 90, but allow its rotation relative thereto. A pair of O-rings may be mounted on the outer wall of the outward end portion 94 of the third housing portion 90 to provide a fluid-tight seal between the outer wall of the outward end portion 94 and the inner wall of the connector. Other connectors or direct connection to the outward end portion 94 of the third housing portions 90 such as by threads formed on the outward end portion may be used for connections of the valves 10A and 10B to a water tank of a toilet, an ice maker, a dishwasher or other plumbing fixtures or equipment.

As shown in FIGS. 4 and 7, when the end bushing 52 is fully inserted into the first housing portion 14 to position the rib 60 within the groove 66 of the first housing portion, an outer end 122 of the end bushing is flush with the outer end 21 of the first axial bore 18 of the first housing portion. With such an arrangement, the valves 10A and 10B may be installed with their outer end portions immediately adjacent to a wall or escutcheon, substantially with no unsightly gap therebetween.

FIG. 15 shows a test cap push-fit fitting 10C using the end bushing 52 with the rib 60 and having the housing portion 14 with the interior circumferential groove 66 sized to receive the rib, in accordance with the present invention.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A plumbing fitting couplable with a free-end portion of a pipe, comprising:
    a housing having a chamber with a chamber opening and an interior chamber wall portion with a circumferentially extending chamber groove;
    an end bushing having an end bushing interior opening sized for positioning of the free-end portion of the pipe therein and an end bushing exterior wall portion located within the chamber and having an outwardly projecting, circumferentially extending locking member sized and shaped to fit within the chamber groove to resist movement of the end bushing out of the chamber opening, the end bushing interior opening having an end bushing interior wall portion sized to be engaged by the free-end portion of the pipe when within the end bushing interior opening prior to the locking member being moved out of the chamber groove to resist unlocking relative movement between the interior chamber wall portion and the end bushing exterior wall portion moving the locking member out of the chamber groove while the free-end portion of the pipe is within the end bushing interior opening;
    a seal having a seal interior opening, the seal being located within the chamber in fluid-tight engagement with the housing and positioned for fluid-tight engagement with the free-end portion of the pipe when positioned within the seal interior opening; and
    a gripper ring having a gripper ring interior opening, the gripper ring being located within the chamber, the gripper ring including gripper teeth extending inwardly into the gripper ring interior opening in position for gripping engagement with the free-end portion of the pipe when positioned within the gripper ring interior opening to resist non-rotational movement of the pipe out of the chamber opening.

2. The plumbing fitting of claim 1, wherein the chamber groove has a first transverse end wall facing in a first direction and the locking member has a second transverse end wall facing in a second direction opposite to the first direction, with the first and second transverse end walls in engagement to resist movement of the end bushing toward the chamber opening.

3. The plumbing fitting of claim 2, wherein the chamber has a longitudinal axis, and the first and second end walls extend circumferentially orthogonal to the axis.

4. The plumbing fitting of claim 1, wherein the chamber has a longitudinal axis, and the chamber groove and the end bushing locking member extend circumferentially orthogonal to the axis.

5. The plumbing fitting of claim 1, further including:
    a second gripper ring having a second gripper ring interior opening, the second gripper ring being located within the chamber, the second gripper ring including gripper teeth extending inwardly into the second gripper ring interior opening in position for gripping engagement with the free-end portion of the pipe when positioned within the second gripper ring interior opening to resist non-rotational movement of the pipe out of the chamber opening.

6. The plumbing fitting of claim 1, wherein the chamber has an outer chamber end wall defining the chamber opening, and the end bushing has an outer end bushing end wall positioned flush with the chamber end wall.

7. The plumbing fitting of claim 1, wherein the end bushing exterior wall portion is a continuous perimeter sidewall.

8. A plumbing fitting couplable with a free-end portion of a pipe, comprising:
    a housing having a chamber with a chamber opening and an interior chamber wall portion with a circumferentially extending chamber groove;
    an end bushing having an end bushing interior opening sized for positioning of the free-end portion of the pipe therein and an end bushing exterior wall portion located within the chamber and having an outwardly projecting, circumferentially extending locking member sized and shaped to fit within the chamber groove to resist movement of the end bushing out of the chamber opening, the locking member being movable out of the chamber groove upon unlocking relative movement between the interior chamber wall portion and the end bushing exterior wall portion;
    a seal having a seal interior opening, the seal being located within the chamber in fluid-tight engagement with the housing and positioned for fluid-tight engagement with the free-end portion of the pipe when positioned within the seal interior opening; and
    a gripper ring having a gripper ring interior opening, the gripper ring being located within the chamber, the gripper ring including gripper teeth extending inwardly into the gripper ring interior opening in position for gripping engagement with the free-end portion of the pipe when positioned within the gripper ring interior opening to resist non-rotational movement of the pipe out of the chamber opening.

9. The plumbing fitting of claim 8, wherein the end bushing interior opening has an end bushing interior wall portion sized to be engaged by the free-end portion of the pipe when within the end bushing interior opening prior to the locking member being moved out of the chamber groove to resist the unlocking relative movement between the interior chamber wall portion and the end bushing exterior wall portion while the free-end portion of the pipe is within the end bushing interior opening.

10. The plumbing fitting of claim 8, wherein the chamber groove has a first transverse end wall facing in a first direction and the locking member has a second transverse end wall facing in a second direction opposite to the first direction, with the first and second transverse end walls in engagement to resist movement of the end bushing toward the chamber opening.

11. The plumbing fitting of claim 10, wherein the chamber has a longitudinal axis, and the first and second end walls extend circumferentially orthogonal to the axis.

12. The plumbing fitting of claim 8, wherein the chamber has a longitudinal axis, and the chamber groove and the end bushing locking member extend circumferentially orthogonal to the axis.

13. The plumbing fitting of claim 8, further including:
a second gripper ring having a second gripper ring interior opening, the second gripper ring being located within the chamber, the second gripper ring including gripper teeth extending inwardly into the second gripper ring interior opening in position for gripping engagement with the free-end portion of the pipe when positioned within the second gripper ring interior opening to resist non-rotational movement of the pipe out of the chamber opening.

14. The plumbing fitting of claim 8, wherein the chamber has an outer chamber end wall defining the chamber opening, and the end bushing has an outer end bushing end wall positioned flush with the chamber end wall.

15. The plumbing fitting of claim 8, wherein the end bushing exterior wall portion is a continuous perimeter sidewall.

16. A plumbing fitting couplable with a free-end portion of a pipe, comprising:
a housing having a chamber with a chamber opening and an interior chamber wall portion with a circumferentially extending chamber groove;
an end bushing having an end bushing interior opening sized for positioning of the free-end portion of the pipe therein and an end bushing exterior wall portion located within the chamber and having an outwardly projecting, circumferentially extending locking member sized and shaped to fit within the chamber groove to resist movement of the end bushing out of the chamber opening, the end bushing interior opening having an end bushing interior wall portion sized to be engaged by the free-end portion of the pipe when within the end bushing interior opening to resist disengagement of the locking member from the chamber groove while the free-end portion of the pipe is within the end bushing interior opening;
a seal having a seal interior opening, the seal being located within the chamber in fluid-tight engagement with the housing and positioned for fluid-tight engagement with the free-end portion of the pipe when positioned within the seal interior opening; and
a gripper ring having a gripper ring interior opening, the gripper ring being located within the chamber, the gripper ring including gripper teeth extending inwardly into the gripper ring interior opening in position for gripping engagement with the free-end portion of the pipe when positioned within the gripper ring interior opening to resist non-rotational movement of the pipe out of the chamber opening.

17. A plumbing fitting couplable with a free-end portion of a pipe, comprising:
a housing having a chamber with a chamber opening and an interior chamber wall portion with a circumferentially extending chamber groove;
an end bushing having an end bushing interior opening sized for positioning of the free-end portion of the pipe therein and an end bushing exterior wall portion located within the chamber and having an outwardly projecting, circumferentially extending locking member sized and shaped to fit within the chamber groove to resist movement of the end bushing out of the chamber opening, the end bushing having an interior wall portion, and first and second axial ends, with a gap extending fully between the first and second axial ends, and extending fully between the exterior wall portion and the interior wall portion, to define a C-shape;
a seal having a seal interior opening, the seal being located within the chamber in fluid-tight engagement with the housing and positioned for fluid-tight engagement with the free-end portion of the pipe when positioned within the seal interior opening; and
a gripper ring having a gripper ring interior opening, the gripper ring being located within the chamber, the gripper ring including gripper teeth extending inwardly into the gripper ring interior opening in position for gripping engagement with the free-end portion of the pipe when positioned within the gripper ring interior opening to resist non-rotational movement of the pipe out of the chamber opening.

18. A plumbing fitting couplable with a free-end portion of a pipe, comprising:
a housing having a chamber with a chamber opening and an interior chamber wall portion with a circumferentially extending chamber groove;
an end bushing having an end bushing interior opening sized for positioning of the free-end portion of the pipe therein and an end bushing exterior wall portion located within the chamber and having an outwardly projecting, circumferentially extending locking member sized and shaped to fit within the chamber groove to resist movement of the end bushing out of the chamber opening, the end bushing having an interior wall portion, and first and second axial ends, with a gap extending only partially between the first and second axial ends, and extending fully between the exterior wall portion and the interior wall portion;
a seal having a seal interior opening, the seal being located within the chamber in fluid-tight engagement with the housing and positioned for fluid-tight engagement with the free-end portion of the pipe when positioned within the seal interior opening; and
a gripper ring having a gripper ring interior opening, the gripper ring being located within the chamber, the gripper ring including gripper teeth extending inwardly into the gripper ring interior opening in position for gripping engagement with the free-end portion of the pipe when positioned within the gripper ring interior opening to resist non-rotational movement of the pipe out of the chamber opening.

19. The plumbing fitting of claim 18, wherein the gap extends past the locking member, and the locking member has a first locking member end and a second locking member end, with the first locking member end being on one side of the gap and the second locking member end being on an opposite side of the gap.

20. A plumbing fitting couplable with a free-end portion of a pipe, comprising:
a housing having a chamber with a chamber opening and an interior chamber wall portion with a circumferentially extending chamber groove;
an end bushing having an end bushing interior opening sized for positioning of the free-end portion of the pipe therein and an end bushing exterior wall portion located within the chamber and having an outwardly projecting, circumferentially extending locking member sized and shaped to fit within the chamber groove to resist movement of the end bushing out of the chamber opening, the end bushing having an interior wall portion, and first and second axial ends, with a groove having a depth extending only partially between the first and second axial ends, and extending only partially between the exterior wall portion and the interior wall portion;

a seal having a seal interior opening, the seal being located within the chamber in fluid-tight engagement with the housing and positioned for fluid-tight engagement with the free-end portion of the pipe when positioned within the seal interior opening; and a gripper ring having a gripper ring interior opening, the gripper ring being located within the chamber, the gripper ring including gripper teeth extending inwardly into the gripper ring interior opening in position for gripping engagement with the free-end portion of the pipe when positioned within the gripper ring interior opening to resist non-rotational movement of the pipe out of the chamber opening.

21. The plumbing fitting of claim 20, wherein the groove extends past the locking member, and the locking member has a first locking member end and a second locking member end, with the first locking member end being on one side of the groove and the second locking member end being on an opposite side of the groove.

22. A plumbing fitting couplable with a free-end portion of a pipe, comprising:

a housing having a chamber with a chamber opening and an interior chamber wall portion;

an end bushing having an end bushing interior opening sized for positioning of the free-end portion of the pipe therein and an end bushing exterior wall portion located within the chamber, one of the interior chamber wall portion and the end bushing exterior wall portion having a circumferentially extending groove, and the other of the interior chamber wall portion and the end bushing exterior wall portion having an outwardly projecting, circumferentially extending locking member sized and shaped to fit within the groove to resist movement of the end bushing out of the chamber opening;

a seal having a seal interior opening, the seal being located within the chamber in fluid-tight engagement with the housing and positioned for fluid-tight engagement with the free-end portion of the pipe when positioned within the seal interior opening; and a gripper ring having a gripper ring interior opening, the gripper ring being located within the chamber, the gripper ring including gripper teeth extending inwardly into the gripper ring interior opening in position for gripping engagement with the free-end portion of the pipe when positioned within the gripper ring interior opening to resist non-rotational movement of the pipe out of the chamber opening, the end bushing interior opening having an end bushing interior wall portion sized to be engaged by the free-end portion of the pipe when within the end bushing interior opening prior to the locking member being moved out of the groove to resist unlocking relative movement between the interior chamber wall portion and the end bushing exterior wall portion moving the locking member out of the groove while the free-end portion of the pipe is within the end bushing interior opening.

23. A plumbing fitting couplable with a free-end portion of a pipe, comprising:

a housing having a chamber with a chamber opening and an interior chamber wall portion;

an end bushing having an end bushing interior opening sized for positioning of the free-end portion of the pipe therein and an end bushing exterior wall portion located within the chamber, one of the interior chamber wall portion and the end bushing exterior wall portion having a circumferentially extending groove, and the other of the interior chamber wall portion and the end bushing exterior wall portion having an outwardly projecting, circumferentially extending locking member sized and shaped to fit within the groove to resist movement of the end bushing out of the chamber opening, the locking member being movable out of the groove upon unlocking relative movement between the interior chamber wall portion and the end bushing exterior wall portion;

a seal having a seal interior opening, the seal being located within the chamber in fluid-tight engagement with the housing and positioned for fluid-tight engagement with the free-end portion of the pipe when positioned within the seal interior opening; and a gripper ring having a gripper ring interior opening, the gripper ring being located within the chamber, the gripper ring including gripper teeth extending inwardly into the gripper ring interior opening in position for gripping engagement with the free-end portion of the pipe when positioned within the gripper ring interior opening to resist non-rotational movement of the pipe out of the chamber opening.

24. The plumbing fitting of claim 23, wherein the end bushing interior opening has an end bushing interior wall portion sized to be engaged by the free-end portion of the pipe when within the end bushing interior opening prior to the locking member being moved out of the groove to resist the unlocking relative movement between the interior chamber wall portion and the end bushing exterior wall portion while the free-end portion of the pipe is within the end bushing interior opening.

25. A plumbing fitting couplable with a free-end portion of a pipe, comprising:

a housing having a chamber with a chamber opening and an interior chamber wall portion;

an end bushing having an end bushing interior opening sized for positioning of the free-end portion of the pipe therein and an end bushing exterior wall portion located within the chamber, one of the interior chamber wall portion and the end bushing exterior wall portion having a circumferentially extending groove, and the other of the interior chamber wall portion and the end bushing exterior wall portion having an outwardly projecting, circumferentially extending locking member sized and shaped to fit within the groove to resist movement of the end bushing out of the chamber opening, the end bushing interior opening having an end bushing interior wall portion sized to be engaged by the free-end portion of the pipe when within the end bushing interior opening to resist disengagement of the locking member from the groove while the free-end portion of the pipe is within the end bushing interior opening;

a seal having a seal interior opening, the seal being located within the chamber in fluid-tight engagement with the housing and positioned for fluid-tight engagement with the free-end portion of the pipe when positioned within the seal interior opening; and a gripper ring having a gripper ring interior opening, the gripper ring being located within the chamber, the gripper ring including gripper teeth extending inwardly into the gripper ring interior opening in position for gripping engagement with the free-end portion of the pipe when positioned within the gripper ring interior opening to resist non-rotational movement of the pipe out of the chamber opening.

26. A plumbing fitting couplable with a free-end portion of a pipe, comprising:

a housing having a chamber with a chamber opening and an interior chamber wall portion;

an end bushing having an end bushing interior opening sized for positioning of the free-end portion of the pipe therein and an end bushing exterior wall portion located within the chamber, one of the interior chamber wall portion and the end bushing exterior wall portion having a circumferentially extending groove, and the other of the interior chamber wall portion and the end bushing exterior wall portion having an outwardly projecting, circumferentially extending locking member sized and shaped to fit within the groove to resist movement of the end bushing out of the chamber opening, the end bushing having an interior wall portion, and first and second axial ends, with a gap extending fully between the first and second axial ends, and extending fully between the exterior wall portion and the interior wall portion, to define a C-shape;

a seal having a seal interior opening, the seal being located within the chamber in fluid-tight engagement with the housing and positioned for fluid-tight engagement with the free-end portion of the pipe when positioned within the seal interior opening; and a gripper ring having a gripper ring interior opening, the gripper ring being located within the chamber, the gripper ring including gripper teeth extending inwardly into the gripper ring interior opening in position for gripping engagement with the free-end portion of the pipe when positioned within the gripper ring interior opening to resist non-rotational movement of the pipe out of the chamber opening.

27. A plumbing fitting couplable with a free-end portion of a pipe, comprising:

a housing having a chamber with a chamber opening and an interior chamber wall portion, the interior chamber wall portion having a first locking member;

an end bushing having an end bushing interior opening sized for positioning of the free-end portion of the pipe therein and an end bushing exterior wall portion located within the chamber, the end bushing exterior wall portion having a second locking member, the first and second locking members being in locking engagement to resist movement of the end bushing out of the chamber opening when the end bushing exterior wall portion is within the interior chamber wall portion, the end bushing interior opening having an end bushing interior wall portion sized to be engaged by the free-end portion of the pipe when within the end bushing interior opening prior to the first and second locking members being moved out of locking engagement to resist unlocking relative movement between the interior chamber wall portion and the end bushing exterior wall portion moving the first and second locking members out of locking engagement while the free-end portion of the pipe is within the end bushing interior opening;

a seal having a seal interior opening, the seal being located within the chamber in fluid-tight engagement with the housing and positioned for fluid-tight engagement with the free-end portion of the pipe when positioned within the seal interior opening; and a gripper ring having a gripper ring interior opening, the gripper ring being located within the chamber, the gripper ring including gripper teeth extending inwardly into the gripper ring interior opening in position for gripping engagement with the free-end portion of the pipe when positioned within the gripper ring interior opening to resist non-rotational movement of the pipe out of the chamber opening.

28. The plumbing fitting of claim 27, wherein housing has an end wall spaced apart from the first chamber opening to define a pipe end cap.

29. A plumbing fitting couplable with a free-end portion of a pipe, comprising:

a housing having a chamber with a chamber opening and an interior chamber wall portion, the interior chamber wall portion having a first locking member;

an end bushing having an end bushing interior opening sized for positioning of the free-end portion of the pipe therein and an end bushing exterior wall portion located within the chamber, the end bushing exterior wall portion having a second locking member, the first and second locking members being in locking engagement to resist movement of the end bushing out of the chamber opening when the end bushing exterior wall portion is within the interior chamber wall portion, the end bushing having an interior wall portion, and first and second axial ends, with a gap extending fully between the first and second axial ends, and extending fully between the exterior wall portion and the interior wall portion, to define a C-shape;

a seal having a seal interior opening, the seal being located within the chamber in fluid-tight engagement with the housing and positioned for fluid-tight engagement with the free-end portion of the pipe when positioned within the seal interior opening; and a gripper ring having a gripper ring interior opening, the gripper ring being located within the chamber, the gripper ring including gripper teeth extending inwardly into the gripper ring interior opening in position for gripping engagement with the free-end portion of the pipe when positioned within the gripper ring interior opening to resist non-rotational movement of the pipe out of the chamber opening.

* * * * *